Patented Apr. 12, 1949

2,466,738

UNITED STATES PATENT OFFICE 2,466,738

REACTION OF ENOL ESTERS WITH ANHYDRIDES

Benjamin Phillips, Jr., Charleston, W. Va., assignor to Carbide and Carbon Chemicals Corporation, a corporation of New York No Drawing. Application October 5, 1945, Serial No. 620,623

17 Claims. (Cl. 260—491)

This invention relates to the production of enol esters by the reaction of the carboxylic acid ester of the enolic form of a ketone with a carboxylic acid anhydride, as in the synthesis of isopropenyl propionate from isopropenyl acetate and propionic anhydride.

It is known that an aldehyde or ketone may form an enol ester characterized by the grouping

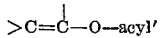

and for the preparation of certain enol esters it has been proposed to acylate with acetic anhydride, as for instance in the production of acetoxybutadiene, $CH_2=CHCH=CHOCOCH_3$, from crotonaldehyde and acetic anhydride in the presence of a large amount of sodium acetate. The reaction is of limited applicability and usefulness. All aldehydes and ketones do not react with acetic anhydride or other anhydride, and as in the case of acetoxybutadiene, the yields and efficiencies are usually poor. It has also been proposed to acylate with an acid chloride, but the use of an acid chloride such as benzoyl chloride, for instance, is attended by poor yields and problems of corrosion. Ketene is a useful reagent for the preparation of enol esters, but since the homologs and derivatives of ketene are not available, this method is limited to the preparation of acetates. The present invention provides a method of converting the products of the ketene reaction into enol esters of carboxylic acids other than acetic acid.

This invention is based on the discovery that a carboxylic acid ester of the enolic form of a ketone may be converted to the ester of another and different carboxylic acid by reacting the enol ester with the anhydride of the carboxylic acid of the ester to be produced. The overall result of the reaction is an interchange of acyl groups between the carboxylic acid anhydride and the enol ester which is the starting material, with the acyl group of the enol ester being displaced by an acyl group from the anhydride. The acyl group displaced from the enol ester apparently enters the anhydride molecule to form a mixed acid anhydride. The reaction which appears to be of broad applicability may be illustrated by the following general equation:

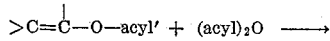
Enol ester starting material    Acid anhydride

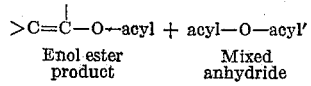
Enol ester product    Mixed anhydride in which Ac and $Ac^1$ represent different acyl groups of the enol ester starting material and of the acid anhydride, respectively.

The present invention provides a convenient and economical way of making enol esters of a large variety of carboxylic acids which heretofore were not readily obtainable in good yields and efficiencies. When isopropenyl acetate and butyric anhydride, for instance, are reacted according to the process of the present invention, the products are isopropenyl butyrate and the mixed acetic butyric anhydride. Usually it will be found more convenient to decompose the mixed anhydride than to isolate it. Mixed acetic butyric anhydride can be converted to acetic anhydride and butyric anhydride. In the practice of this invention the butyric anhydride can be returned to the process, and the acetic anhydride can be reacted with butyric acid for the preparation of butyric anhydride to be used in the process. A similar cycle of steps can be employed for other carboxylic acid anhydrides used. Furthermore, the process can be carried out in ordinary equipment not suitable for other processes requiring a reaction pressure above atmospheric pressure or using corrosive materials in the reaction mixture. The process of this invention can also be carried out, starting with the carboxylic acid, after first converting the acid to its anhydride. The enol ester first reacts with the carboxylic acid to form an anhydride, and this anhydride then reacts with more of the enol ester as previously described. When isopropenyl acetate, for instance, is heated with 2-ethylhexoic acid in the presence of sulfuric acid as a catalyst the two react to form acetone and the mixed anhydride of acetic acid and 2-ethylhexoic acid. By using more than one mol of isopropenylacetate per mol of 2-ethylhexoic acid, the unreacted isopropenyl acetate then remains for reaction with the mixed anhydride to give acetic anhydride and the desired isopropenyl 2-ethylhexoate.

The carboxylic acid anhydrides which can be reacted with enol esters in accordance with the process of the present invention may be open-chain or cyclic, saturated or unsaturated, aromatic or aliphatic, including cycloaliphatic, and containing not less than two carbon atoms to the acyl radical. Preferably, the carboxylic acid contains not more than twenty carbon atoms to the molecule. Suitable carboxylic acid anhydrides include propionic, butyric, pentanoic, hexanoic, heptanoic, octanoic, nonanoic, decanoic, lauric, myristic, palmitic, margaric, stearic, acrylic, crotonic, angelic, pentenoic, hexenoic, oleic, linoleic, linolenic, succinic, adipic, benzoic, toluic, cyclohexanoic, maleic, sorbic and the like.

Enol esters which can be converted into esters of another and different carboxylic acid, corresponding to the acid anhydrides listed above, include the esters of the enolic form of such ketones as acetone, $CH_3COCH_3$; methyl ethyl ketone, $CH_3COC_2H_5$; methyl propyl ketones, $CH_3COC_3H_7$; methyl butyl ketones, $CH_3COC_4H_9$; methyl pentyl ketones, $CH_3COC_5H_{11}$; methyl hexyl ketones, $CH_3COC_6H_{13}$; methyl heptyl ketones, $$CH_3COC_7H_{15}$$

methyl octyl ketones, $CH_3COC_8H_{17}$; methyl nonyl ketones, $CH_3COC_9H_{19}$; methyl decyl ketones, $CH_3COC_{10}H_{21}$; diethyl ketone, $$C_2H_5COC_2H_5$$

ethyl propyl ketones, $C_2H_5COC_3H_7$; ethyl butyl ketones, $C_2H_5COC_4H_9$; ethyl pentyl ketones, $C_2H_5COC_5H_{11}$; ethyl hexyl ketones, $C_2H_5COC_6H_{13}$; ethyl heptyl ketones, $C_2H_5COC_7H_{15}$; dipropyl ketones, $C_3H_7COC_3H_7$; propyl butyl ketones, $C_3H_7COC_4H_9$; propyl pentyl ketones, $$C_3H_7COC_5H_{11}$$

propyl hexyl ketones, $C_3H_7COC_6H_{13}$; dibutyl ketones, $C_4H_9COC_4H_9$; butyl pentyl ketones, $C_4H_9COC_5H_{11}$; dipentyl ketones, $C_5H_{11}COC_5H_{11}$; methyl cyclohexyl ketone, $CH_3COC_6H_{11}$; ethyl cyclohexyl ketone, $C_2H_5COC_6H_{11}$; propyl cyclohexyl ketones, $C_2H_5COC_6H_{11}$; cyclohexyl acetate, $C_6H_{11}CH_2COCH_3$; cyclohexanone, $C_6H_{10}O$; methyl cyclohexanones, $CH_3C_6H_9O$; ethyl cyclohexanones, $C_2H_5C_6H_9O$; propyl cyclohexanones, $C_3H_7C_6H_9O$; butyl cyclohexanones, $C_4H_9C_6H_9O$; acetophenone, $C_6H_5COCH_3$; tolyl methyl ketones, $CH_3C_6H_4COCH_3$; benzyl methyl ketone, $$C_6H_5CH_2COCH_3$$

acetylacetone, $CH_3COCH_2COCH_3$.

In carrying out the reaction, the enol ester which is to be converted to the ester of another and different carboxylic acid can be mixed with the anhydride which corresponds to the carboxylic acid of the ester to be produced, and the mixture reacted in the presence of a suitable esterification catalyst. Equimolar proportions of the enol ester and the anhydride can be used, or of desired, either can be present in excess. In general, the reaction temperature may be from about 40° to 275° C., depending upon the particular enol ester to be converted and the carboxylic acid anhydride employed. Within this range the most useful temperatures are found from about 80° to 175° C. which are preferred. The reaction can be conducted either in the liquid phase or in the vapor phase, in the presence of the catalyst. It can be carried out at normal atmospheric pressure, or at higher or lower pressures if desired. A liquid phase reaction at atmospheric pressure is preferred. In carrying out the reaction in the liquid phase, the reaction mixture may be heated and maintained at its refluxing temperature for a suitable period of time and then distilled. Usually a refluxing period from about 1 to 5 hours will be found suitable.

The reaction can be catalyzed with a strong acid such as sulfuric acid, p-toluene sulfonic acid, phosphoric acid and the like, or a strongly electrophilic compound such as zinc chloride, aluminum chloride, boron trifluoride and others. Sulfuric acid is preferred, however. The quantity of catalyst can be varied between wide limits. About 0.5 per cent of the total weight of the reactants will be found to be a convenient amount, but if desired, from about 0.1 to 10 per cent may be used.

If the products are separated by distillation it may be found desirable first to neutralize the acidic catalyst with a tertiary amine or with sodium acetate, for instance, prior to the distillation step, to minimize decomposition or to avoid favoring a reversal of the reaction; but it is not essential to do so. If the reaction mixture is not neutralized, the initial distillation should be carried out as rapidly as possible. For many purposes a separation of the products by distillation under reduced pressure may be found to give satisfactory results.

The invention may be illustrated by the following examples:

EXAMPLE 1

Isopropenyl 2-ethylhexoate

A mixture of 1,080 parts of 2-ethylhexoic anhydride, 400 parts of isopropenyl acetate and three parts of concentrated sulfuric acid was heated for two hours by means of an oil bath held at 115° to 120° C. The catalyst was then neutralized by adding 5 parts of anhydrous sodium acetate, and the mixture was fractionally distilled under reduced pressure. The first part of the distillation was carried out at 200 millimeters pressure to maintain a high kettle temperature to decompose rapidly the mixed anhydride formed. In addition to the recovered isopropenyl acetate, acetic anhydride and 2-ethylhexoic anhydride, there was obtained 348 parts of isopropenyl 2-ethylhexoate as a colorless liquid boiling at 69° C. at a pressure of 5 millimeters and having a refractive index, $n_D^{30}$, of 1.4213. The yield of isopropenyl 2-ethylhexoate was 47 per cent of the theoretical. The efficiency, calculated from reactants consumed, was 83 per cent based on the isopropenyl acetate and 78 per cent based on the 2-ethylhexoic anhydride.

EXAMPLE 2

Isopropenyl butyrate

A mixture of 1,264 parts of butyric anhydride, 800 parts isopropenyl acetate and 4.3 parts of concentrated sulfuric acid was refluxed for two hours. The reaction mixture was distilled after neutralization with 14.5 parts of anhydrous sodium acetate. The fraction distilling between 60° C. at a pressure of 100 millimeters and 50° C. at a pressure of 15 millimeters consisted mainly of acetic anhydride and isopropenyl butyrate. This fraction was steam distilled at 100 millimeters to recover a non-aqueous layer. Upon rectification through a fractionating column, there was obtained 259 parts of isopropenyl butyrate, a colorless liquid, boiling at 78° C. at a pressure of 100 millimeters and having a refractive index, $n_D^{30}$, of 1.4070. The yield was 25%. The efficiency was 72 per cent based on the isopropenyl acetate and 75 per cent based on the butyric anhydride.

EXAMPLE 3

Isopropenyl propionate

A mixture of 2,080 parts of propionic anhydride, 800 parts of isopropenyl acetate and 8.8 parts of concentrated sulfuric acid was heated at the refluxing temperature of the mixture for a period of four hours. After neutralizing the reaction mixture with 29 parts of anhydrous sodium acetate, the product was fractionally distilled. There was obtained 393 grams of isopropenyl propionate boiling at 60.5° C. at a pressure of 100 millimeters and having a refractive index, $n_D^{30}$, of 1.4019. The yield was 44 per cent while the efficiency was 78 per cent based on the isopropenyl acetate and 66 per cent on the propionic anhydride.

EXAMPLE 4

Butenyl 2-ethylhexoate

A mixture of 342 parts of the enol acetate of methyl ethyl ketone, 1,620 parts of 2-ethylhexoic anhydride and 3.9 parts of concentrated sulfuric acid was heated under reflux for three hours. After neutralization with 13 parts of anhydrous sodium acetate, the mixture was distilled under reduced pressure. The fraction boiling at 90–105° C. at pressure of 10 millimeters was heated in water to hydrolyze any anhydride. The non-aqueous layer was rectified through a fractionating column to yield 148 parts of butenyl 2-ethylhexoate. The mixture of isomers distilled at 93°–98° C. at a pressure of 10 millimeters and had a refractive index range, $n_D^{30}$, of 1.4274 to 1.4292. The yield was 29 per cent.

EXAMPLE 5

Isopropenyl benzoate

A reaction mixture containing 857 parts (3.79 mols) of benzoic anhydride, 760 parts (7.6 mols) of isopropenyl acetate, and 6.26 parts of concentrated sulfuric acid, all by weight, was heated at its refluxing temperature of about 105° C. for a period of approximately six hours. The reaction mixture was then distilled and the unreacted material recovered. There was obtained about 84 parts (0.52 mol) of isopropenyl benzoate, corresponding to a yield of 14 per cent, based on the anhydride. The isopropenyl benzoate was found to have the following properties: boiling point, at 5 millimeters pressure, 83–84° C.; $n_D^{20}$, 1.5165; $d$ 20/20, 1.0476.

The equilibrium is unfavorable in the reaction of this anhydride with isopropenyl acetate, which accounts for the relatively low percentage yield, based on the anhydride. The efficiency is good, however, and further amounts of isopropenyl benzoate may be obtained by recycling the recovered starting materials.

EXAMPLE 6

Isopropenyl sorbate

A mixture of 433 parts of crude sorbic anhydride (made by reacting sorbic acid with acetic anhydride and removing the acetic acid and excess anhydride), 400 parts of isopropenyl acetate and 1.7 parts of concentrated sulfuric acid was refluxed for two hours. The reaction mixture was then neutralized with 5.7 parts of anhydrous sodium acetate and fractionally distilled under reduced pressure. Some 18 parts of isopropenyl sorbate, a colorless liquid, boiling point 74°–75° C. at a pressure of 5 millimeters and having a refractive index, $n_D^{30}$, of 1.5021, were recovered.

I claim:

1. A process which comprises forming a mixture of an enol ester and a carboxylic acid anhydride each composed of carbon, hydrogen and oxygen, with the oxygen being present therein in carbon to oxygen to carbon and in carbonyl linkage only, said enol ester having the characteristic enol ester structure

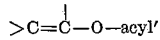

in which the enolic carbon atom has two carbon atoms attached directly thereto, and said carboxylic acid anhydride having the characteristic structure

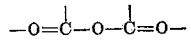

in which each acyl group thereof has at least three carbon atoms and is different from the acyl' group of said enol ester; and heating said mixture at its reaction temperature in the presence of an esterification catalyst to form another enol ester characterized by the structure

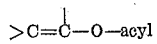

and differing from said first enol ester in the acyl group thereof which is the same as said acyl group of the acid anhydride, the enol alcohol radicals of both of said enol esters being the same.

2. A process which comprises forming a mixture of an enol ester and a monocarboxylic acid anhydride each composed of carbon, hydrogen and oxygen, with the oxygen being present therein in carbon to oxygen to carbon and in carbonyl linkage only, said enol ester having the characteristic enol ester structure

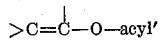

in which the enolic carbon atom has two carbon atoms attached directly thereto, and said monocarboxylic acid anhydride having the characteristic structure

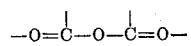

in which each acyl group thereof has at least three carbon atoms and is different from the acyl' group of said enol ester; and heating said mixture at a temperature of about 40° to 275° C. in the presence of an esterification catalyst to form another enol ester characterized by the structure

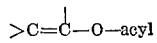

and differing from said first enol ester in the acyl group thereof which is the same as said acyl group of the acid anhydride, the enol alcohol radicals of both of said enol esters being the same.

3. A process which comprises forming a mixture of an enol ester and a monocarboxylic acid anhydride each composed of carbon, hydrogen and oxygen, with the oxygen being present therein in carbon to oxygen to carbon and in carbonyl linkage only, said enol ester having the characteristic enol ester structure

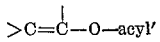

in which the enolic carbon atom has two carbon atoms attached directly thereto, and said carboxylic acid anhydride having the characteristic structure

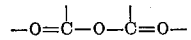

in which each acyl group thereof has at least three carbon atoms and is different from the acyl' group of said enol ester; and heating said mixture at a temperature of about 80° to 175° C. in the presence of an esterification catalyst to form another enol ester characterized by the structure $>C=C-O-acyl$, and differing from said first enol ester in the acyl group thereof which is the same as said acyl group of the acid anhydride, the enol alcohol radicals of both of said enol esters being the same.

4. A process which comprises forming a mixture of an enol ester and a carboxylic acid anhydride each composed of carbon, hydrogen and oxygen, with the oxygen being present therein in carbon to oxygen to carbon and in carbonyl linkage only, said enol ester having the characteristic enol ester structure

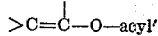

in which both the acyl' group and the group joined to it by the oxygen atom thereof are aliphatic and contain not more than twenty carbon atoms each with the enolic carbon atom having two carbon atoms attached directly thereto, and said aliphatic carboxylic acid anhydride having the characteristic structure

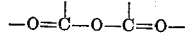

in which each acyl group thereof has from three to twenty carbon atoms and is different from the acyl' group of said enol ester; and heating said mixture at its reaction temperature in the presence of an acidic esterification catalyst to form another enol ester characterized by the structure

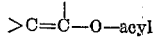

and differing from said first enol ester in the acyl group thereof which is the same as said acyl group of the acid anhydride, the enol alcohol radicals of both of said enol esters being the same.

5. A process which comprises forming a mixture of an enol ester and a monocarboxylic acid anhydride each composed of carbon, hydrogen and oxygen, with the oxygen being present therein in carbon to oxygen to carbon and in carbonyl linkage only, said enol ester having the characteristic enol ester structure

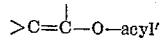

in which both the acyl' group and the group joined to it by the oxygen atom thereof are aliphatic and contain not more than twenty carbon atoms each with the enolic carbon atom having two carbon atoms attached directly thereto, and said aliphatic carboxylic acid anhydride having the characteristic structure

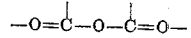

in which each acyl group thereof has from three to twenty carbon atoms and is different from the acyl' group of said enol ester; and heating said mixture at a temperature of about 40° to 275° C. in the presence of an acidic esterification catalyst to form another enol ester characterized by the structure

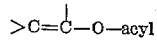

and differing from said first enol ester in the acyl group thereof which is the same as said acyl group of the acid anhydride, the enol alcohol radicals of both of said enol esters being the same.

6. A process which comprises forming a mixture of an enol ester and a monocarboxylic acid anhydride each composed of carbon, hydrogen and oxygen, with the oxygen being present therein in carbon to oxygen to carbon and in carbonyl linkage only, said enol ester having the characteristic enol ester structure

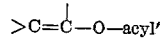

in which both the acyl' group and the group joined to it by the oxygen atom thereof are aliphatic and contain not more than twenty carbon atoms each with the enolic carbon atom having two carbon atoms attached directly thereto, and said aliphatic carboxylic acid anhydride having the characteristic structure

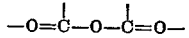

in which each acyl group thereof has from three to twenty carbon atoms and is different from the acyl' group of said enol ester; and heating said mixture at a temperature of about 80° to 175° C. in the presence of an acidic esterification catalyst to form another enol ester characterized by the structure

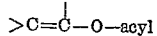

and differing from said first enol ester in the acyl group thereof which is the same as said acyl group of the acid anhydride, the enol alcohol radicals of both of said enol esters being the same.

7. A process which comprises forming a mixture of an enol acetate and a monocarboxylic acid anhydride each composed of carbon, hydrogen and oxygen, with the oxygen being present in carbon to oxygen to carbon and in carbonyl linkage only, said enol acetate having the characteristic enol ester structure

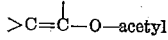

with the enol alcohol radical thereof containing not more than twenty carbon atoms and with the enolic carbon atom having two carbon atoms attached directly thereto, and said carboxylic acid anhydride having the characteristic structure

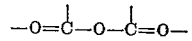

with each acyl group thereof having from three to twenty carbon atoms; and heating said mixture to its reaction temperature in the presence of a small amount of an acidic esterification catalyst to form another enol ester characterized by the structure

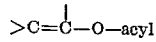

and differing from said enol acetate ester in the acyl group thereof which is the same as said acyl group of the acid anhydride, the enol alcohol radicals of both of said enol esters being the same.

8. A process which comprises forming a mixture of an enol acetate and a monocarboxylic acid anhydride each composed of carbon, hydrogen and oxygen, with the oxygen being present in carbon to oxygen to carbon and in carbonyl linkage only, said enol acetate having the characteristic enol ester structure

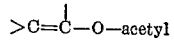

with the enol alcohol radical thereof containing not more than twenty carbon atoms and with the enolic carbon atom thereof having two carbon atoms attached directly thereto, and said carboxylic acid anhydride having the characteristic structure

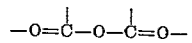

with each acyl group thereof having from three to twenty carbon atoms; and heating said mixture at a temperature of about 40° to 275° C. in the presence of a small amount of an acidic esterification catalyst to form another enol ester characterized by the structure

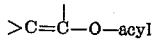

and differing from said enol acetate in the acyl group thereof which is the same as said acyl group of the acid anhydride, the enol alcohol radicals of both of said enol esters being the same.

9. A process which comprises forming a mixture of an enol acetate and a monocarboxylic acid anhydride each composed of carbon, hydrogen and oxygen, with the oxygen being present in carbon to oxygen to carbon and in carbonyl linkage only, said enol acetate having the characteristic enol ester structure

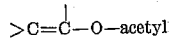

with the enol alcohol radical thereof containing not more than twenty carbon atoms and with the enolic carbon atom thereof having two carbon atoms attached directly thereto, and said carboxylic acid anhydride having the characteristic structure

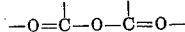

with each acyl group thereof having from three to twenty carbon atoms, and heating said mixture at a temperature of about 80° to 175° C. in the presence of a small amount of an acidic esterification catalyst to form another enol ester characterized by the structure

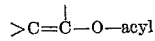

and differing from said enol acetate in the acyl group thereof which is the same as said acyl group of the acid anhydride, the enol alcohol radicals of both of said enol esters being the same.

10. A process which comprises forming a mixture of isopropenyl acetate of the formula $CH_3(CH_2=)C-O-$acetyl, and a monocarboxylic acid anhydride composed of carbon, hydrogen and oxygen, with the oxygen being present in carbon to oxygen to carbon and in carbonyl linkage only, said anhydride having the characteristic structure

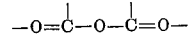

with each acyl group thereof having at least three carbon atoms and heating said mixture to its reaction temperature in the presence of an acidic esterification catalyst to form an isopropenyl ester having the characteristic structure $$CH_3(CH_2=)C-O-acyl$$

and in which the acyl group is the same as said acyl group of the acid anhydride.

11. A process which comprises forming a mixture of isopropenyl acetate of the formula $CH_3(CH_2=)C-O-$acetyl, and an aliphatic monocarboxylic acid anhydride composed of carbon, hydrogen and oxygen, with the oxygen being present in carbon to oxygen to carbon and in carbonyl linkage only, said anhydride having the characteristic anhydride structure

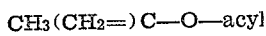

with each aliphatic acyl group thereof having from three to twenty carbon atoms; and heating said mixture at its reaction temperature in the presence of an acidic esterification catalyst to form another isopropenyl ester having the characteristic structure $CH_3(CH_2=)C-O-$acyl, and in which the acyl group is the same as said acyl group of said aliphatic acid anhydride.

12. A process which comprises forming a mixture of isopropenyl acetate of the formula $CH_3(CH_2=)C-O-$acetyl, and an aliphatic monocarboxylic acid anhydride composed of carbon, hydrogen and oxygen, with the oxygen being present in carbon to oxygen to carbon and in carbonyl linkage only, said anhydride having the characteristic anhydride structure

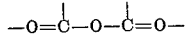

with each aliphatic acyl group having from three to twenty carbon atoms; and heating said mixture at a temperature of about 80° to 175° C. in the presence of an acidic esterification catalyst to form another isopropenyl ester having the characteristic structure $CH_3(CH_2=)C-O-$acyl, in which the acyl group is the same as said acyl group of the aliphatic acid anhydride.

13. A process which comprises forming a mixture of isopropenyl acetate of the formula $CH_3(CH_2=)C-O-$acetyl, and an aliphatic monocarboxylic acid anhydride composed of carbon, hydrogen and oxygen, with the oxygen being present in carbon to oxygen to carbon and in carbonyl linkage only, said anhydride having the characteristic anhydride structure

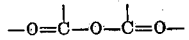

with each of the aliphatic acyl groups having from three to twenty carbon atoms; and heating said mixture at its refluxing temperature in the presence of an acidic esterification catalyst to form another isopropenyl ester having the characteristic structure $CH_3(CH_2=)C-O-$acyl, in which the acyl group is the same as said acyl group of the aliphatic acid anhydride.

14. A process which comprises forming a mixture of an enol ester having the characteristic enol ester structure

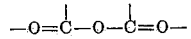

and in which the enolic carbon atom has two carbon atoms attached directly thereto and a monocarboxylic acid anhydride having the characteristic structure

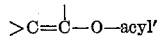

and in which each acyl group thereof has at least three carbon atoms and is different from the acyl' group of said enol ester, said enol ester and said acid anhydride each being composed of carbon, hydrogen and oxygen, with the oxygen being present in carbon to oxygen to carbon and in carbonyl linkage only; and heating said mixture at its reaction temperature in the presence of an esterification catalyst to form another enol ester characterized by the structure

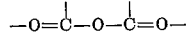

and differing from said said first enol ester in the acyl group thereof which is the same as said acyl group of the acid anhydride, the enol alcohol radicals of both of said enol esters being the same.

15. A process which comprises forming a mixture of ispropenyl acetate of the formula $CH_3(CH_2=)C-O-$acetyl, and a monocarboxylic acid anhydride having the characteristic anhydride structure

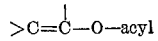

the remainder being composed of carbon and hydrogen with each acyl group thereof having from three to twenty carbon atoms; and heating said mixture at its reaction temperature in the presence of an acidic esterification catalyst to form another isopropenyl ester having the characteristic structure $CH_3(CH_2=)C-O-$acyl, and in which the acyl group is the same as the said acyl group of the acid anhydride.

16. A process which comprises forming a mixture of an enol ester having the characteristic enol ester structure

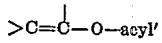

and in which the enolic carbon atom has two carbon atoms attached directly thereto and a monocarboxylic acid anhydride having the characteristic structure

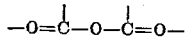

and in which each acyl group thereof has at least three carbon atoms and is different from the acyl' group of said enol ester, said enol ester and said acid anhydride each being composed of carbon, hydrogen and oxygen, with the oxygen being present in carbon to oxygen to carbon and carbonyl linkage only; and heating said mixture at its refluxing temperature in the presence of a small amount of sulfuric acid as catalyst to form another enol ester characterized by the structure

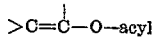

and differing from said first enol ester in the acyl group thereof which is the same as said acyl group of the acid anhydride, the enol alcohol radicals of both of said enol esters being the same.

17. A process which comprises forming a mixture of isopropenyl acetate of the formula $CH_3(CH_2=)C-O-acetyl$, and a monocarboxylic acid anhydride having the characteristic anhydride structure

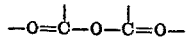

the remainder being composed of carbon and hydrogen with each acyl group thereof having from three to twenty carbon atoms; and heating said mixture at its reaction temperature in the presence of an acidic esterification catalyst to form another isopropenyl ester having the characteristic structure $CH_3(CH_2=)C-O-acyl$, and in which the acyl group is the same as the said acyl group of the acid anhydride.

BENJAMIN PHILLIPS, JR.

REFERENCES CITED

The following references are of record in the file of this patent:

UNITED STATES PATENTS

| Number | Name | Date |
|---|---|---|
| 1,882,808 | Graves | Oct. 18, 1932 |
| 2,079,068 | Herrmann | May 4, 1937 |
| 2,248,438 | Ruzicka et al. | July 8, 1941 |
| 2,299,862 | Toussaint et al. | Oct. 27, 1942 |
| 2,383,965 | Gwynn et al. | Sept. 4, 1945 |

OTHER REFERENCES

Richter, "Organic Chemistry," Spielmann, vol. I, Philadelphia (1921), page 125.

Journal of American Chem. Soc., vol. 56 (1934), pages 1802–1803, 2 pages, Hennion et al.

Post et al., "Jour. Organic Chem.," vol. 2, (1937), pages 260–266.